United States Patent
Tsirkin et al.

(10) Patent No.: US 12,001,869 B2
(45) Date of Patent: Jun. 4, 2024

(54) MEMORY OVER-COMMIT SUPPORT FOR LIVE MIGRATION OF VIRTUAL MACHINES

(71) Applicant: Red Hat, Inc., Raleigh, NC (US)

(72) Inventors: Michael Tsirkin, Yokneam (IL); David Alan Gilbert, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 488 days.

(21) Appl. No.: 17/185,695

(22) Filed: Feb. 25, 2021

(65) Prior Publication Data
US 2022/0269522 A1    Aug. 25, 2022

(51) Int. Cl.
| | | |
|---|---|---|
| *G06F 9/455* | (2018.01) | |
| *G06F 9/50* | (2006.01) | |
| *G06F 12/0868* | (2016.01) | |
| *G06F 12/0873* | (2016.01) | |
| *G06F 12/0882* | (2016.01) | |

(52) U.S. Cl.
CPC ........ *G06F 9/45558* (2013.01); *G06F 9/5077* (2013.01); *G06F 12/0868* (2013.01); *G06F 12/0873* (2013.01); *G06F 12/0882* (2013.01); *G06F 2009/4557* (2013.01); *G06F 2009/45583* (2013.01)

(58) Field of Classification Search
CPC .................................................. G06F 9/45558
USPC ............................................................ 718/1
See application file for complete search history.

(56) References Cited

U.S. PATENT DOCUMENTS

| | | | |
|---|---|---|---|
| 8,832,390 B1 * | 9/2014 | Ahmad ................. | G06F 9/5016 718/1 |
| 9,547,598 B1 * | 1/2017 | Karnowski ........... | G06F 3/0608 |
| 9,823,842 B2 * | 11/2017 | Gopalan ................ | G06F 9/455 |
| 10,002,059 B2 * | 6/2018 | Antony ............... | G06F 9/45558 |

(Continued)

FOREIGN PATENT DOCUMENTS

WO     2020171877     8/2020

OTHER PUBLICATIONS

Chanchio et al., Time-Bound, Thread-Based Live Migration of Virtual Machines, Department of Computer Science, Faculty of Science and Technology, Thammasat University, May 2014, https://www.researchgate.net/publication/269402099_Time-Bound_Thread-Based_Live_Migration_of_Virtual_Machines, 11 pages.

(Continued)

*Primary Examiner* — Mehran Kamran
(74) *Attorney, Agent, or Firm* — Dority & Manning, P.A.

(57) ABSTRACT

Systems and methods for providing memory over-commit support for live migration of virtual machines (VMs). In one implementation, a processing device of a source host computer system may identify a host page cache associated with a VM undergoing live migration from the source to a destination host computer system. The host page cache comprises a first plurality of memory pages associated with the VM. The processing device may transmit, from the source to the destination, at least a part of the host page cache. The processing device may discard the part of the host page cache. The processing device may read into the host page cache one or more memory pages of a second plurality of memory pages associated with the VM. The processing device may transmit, from the source to the destination, the one or more memory pages stored by the host page cache.

20 Claims, 4 Drawing Sheets

(56) References Cited

U.S. PATENT DOCUMENTS

| | | | | |
|---|---|---|---|---|
| 10,042,768 | B1* | 8/2018 | Karnowski | H04L 67/568 |
| 10,552,080 | B2* | 2/2020 | Tsirkin | G06F 3/067 |
| 11,620,233 | B1* | 4/2023 | Habusha | G06F 12/0891 |
| | | | | 711/207 |
| 2014/0013059 | A1* | 1/2014 | Joshi | G06F 9/5077 |
| | | | | 711/144 |
| 2014/0052892 | A1* | 2/2014 | Klein | G06F 12/0866 |
| | | | | 711/103 |
| 2014/0215459 | A1* | 7/2014 | Tsirkin | G06F 9/45558 |
| | | | | 718/1 |
| 2014/0297780 | A1* | 10/2014 | Zhou | H04L 67/5681 |
| | | | | 709/216 |
| 2014/0365816 | A1* | 12/2014 | Antony | G06F 11/2033 |
| | | | | 714/6.11 |
| 2015/0039717 | A1* | 2/2015 | Chiu | H04L 67/1097 |
| | | | | 709/214 |
| 2015/0229717 | A1* | 8/2015 | Gupta | H04L 67/568 |
| | | | | 718/1 |
| 2015/0248237 | A1* | 9/2015 | Tsirkin | G06F 12/1009 |
| | | | | 711/162 |
| 2016/0188353 | A1* | 6/2016 | Shu | G06F 9/45558 |
| | | | | 718/1 |
| 2016/0197986 | A1* | 7/2016 | Chambliss | G06F 9/45558 |
| | | | | 709/213 |
| 2016/0231929 | A1* | 8/2016 | Tsirkin | G06F 12/10 |
| 2016/0246636 | A1* | 8/2016 | Tsirkin | G06F 9/5077 |
| 2016/0253197 | A1* | 9/2016 | Bonzini | G06F 12/0893 |
| | | | | 718/1 |
| 2016/0266844 | A1* | 9/2016 | Ogawa | G06F 12/0813 |
| 2018/0088975 | A1* | 3/2018 | Kaul | G06F 9/45558 |
| 2018/0239707 | A1* | 8/2018 | Tsirkin | G06F 12/0875 |
| 2018/0241838 | A1* | 8/2018 | Druzhinin | H04L 67/1097 |
| 2018/0246751 | A1* | 8/2018 | Dong | G06F 9/45558 |
| 2018/0329737 | A1* | 11/2018 | Dong | G06F 9/45558 |
| 2019/0012110 | A1* | 1/2019 | Okano | G06F 3/0659 |
| 2020/0026556 | A1* | 1/2020 | Chitlur | G06F 12/0835 |
| 2020/0034175 | A1* | 1/2020 | Calciu | G06F 9/45558 |
| 2020/0125384 | A1* | 4/2020 | Serebrin | G06F 9/45558 |
| 2020/0192691 | A1* | 6/2020 | Jiang | G06F 12/109 |
| 2020/0242035 | A1* | 7/2020 | Kolli | G06F 12/0828 |
| 2022/0214905 | A1* | 7/2022 | Balakumaran | G06F 12/0882 |
| 2022/0269522 | A1* | 8/2022 | Tsirkin | G06F 9/5077 |

OTHER PUBLICATIONS

Hines et al., Post-Copy Live Migration of Virtual Machines, Computer Science, Binghamton University (SUNY), Mar. 2009, https://kartikgopalan.github.io/publications/hines09postcopy_osr.pdf, 13 pages.

Zhang et al., Virtual Machine Migration in an Over-committed Cloud, King Abdullah University of Science an dTechnology (KAUST), Saudi Arabia; IBM T. J. Watson Research Center, Hawthorne, NY, 2012, https://mine.kaust.edu.sa/Documents/papers/NOMS_2012.pdf, 8 pages.

Baruchi et al., Improving Virtual Machine Live Migration via Application-level Workload Analysis, University of Sao Paulo, Lahpc; IBM Research—Sao Paulo, Brazil, 6 pages.

* cited by examiner

MEMORY OVER-COMMIT SUPPORT FOR LIVE MIGRATION OF VIRTUAL MACHINES

TECHNICAL FIELD

The present disclosure is generally related to virtualization systems, and more particularly, to memory over-commit support for live migration virtual machines.

BACKGROUND

Virtualization is a computing technique that improves system utilization, decoupling applications from the underlying hardware, and enhancing workload mobility and protection. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system is typically referred to as a "host machine," and the operating system of the host machine is typically referred to as the "host operating system." A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, and so on. A VM may have a virtual processor, virtual system memory, virtual storage, and various virtual devices. VMs may be migrated between a source host computing platform ("the source host") and a destination host computing platform ("the destination host") connected over a network, which may be a local-area network (LAN) or a wide-area network (WAN) that may include the Internet.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Implementations of the disclosure are directed to providing memory over-commit support for live migrations of virtual machines. One approach for migration of a virtual machine (VM) from a source host machine (source host) to a destination host machine (destination host) over a network is to permit a VM running on the source host to continue to run during the migration process, which is referred to as live migration. Live migration typically permits a running VM to be moved between different physical machines transparently for application programs running on the VM and for their respective clients. For successful live migration, VM memory and network connectivity should be migrated from the source host to the destination host.

Certain processor architectures support virtualization by providing special instructions for facilitating virtual machine execution. In certain implementations, a processor may support executing a hypervisor that acts as a host and has full control of the processor and other platform hardware. A hypervisor presents a virtual machine with an abstraction of one or more virtual processors. A hypervisor is able to retain selective control of processor resources, physical memory, interrupt management, and input/output (I/O). Each virtual machine (VM) is a guest software environment that supports a stack consisting of operating system (OS) and application software. Each VM operates independently of other virtual machines and uses the same interface to the processors, memory, storage, graphics, and I/O provided by a physical platform.

A host computer system may support a virtual memory environment in which a VM address space is simulated with a smaller amount of the host random access memory (RAM) and a backing store (e.g., a file on a disk or a raw storage device), thus allowing the host to over-commit the memory, i.e., allocate, to one or more virtual machines running on the host, a total amount of memory that exceeds the amount of host RAM. The VM memory space may be divided into memory pages which may be allocated in the host RAM and swapped or mapped to the backing store when necessary, using either a disk-mapping or memory swapping technique. In disk-mapped virtual machines, memory pages that were recently accessed may be held in the host RAM in a page cache, while other memory pages may be copied to, and mapped to, the backing store. Memory swapping is a similar technique, except that in memory swapping the memory pages in the host RAM may be unmapped from the backing store, thus saving disk space. Disk-mapping techniques may provide advantages over memory-swapping techniques because the VM memory is represented by a disk file on the host, thus making it easier to manage. The guest operating system may maintain a page tracking memory data structure (such as one or more memory page tables) to keep track of the memory pages. When a VM attempts to access a memory page, it may use the memory data structure to translate the virtual address into a physical address. If the page being accessed is not currently in the host RAM, a page-fault exception may be generated, responsive to which the host computer system may read the page from the backing store and continue executing the VM that caused the exception.

During live migration, the hypervisor may copy the VM memory pages from the source host RAM to the destination host over a network while the VM is still running on the source host. For successful live migration, VM memory and network connectivity should be migrated from the source host to the destination host. Methods of group migration may include "pre-copy" and "post-copy" techniques. Pre-copy techniques may involve sending a copy of the state of a VM to the destination host while the VM continues to execute on the source host. If some memory pages change during the process, they may be re-copied until there are very few changes remaining on the source, at which point the VM may be stopped on the source and restarted on the destination. Post-copy techniques may involve suspending the VM on the source, copying a subset of the state of the VM to the destination, and then resuming the VM on the destination. If a post-copied VM attempts to access a page of its own memory that has not been migrated, the attempted access may generate a fault and the requesting VM may stop executing until the memory is retrieved from the source host.

Employing post-copy techniques may provide many advantages over pre-copy techniques for live migration. In particular, pre-copy live migration of VMs that utilize a large amount of memory may be very time consuming since the VM may continue modifying memory on the source host which then needs to be copied to the destination host prior to starting the VM on the destination host. With post-copy live migration, the VM may be started on the destination host despite some of the memory associated with the VM still residing on the source host. Furthermore, post-copy migration may provide advantages for over-committed source hosts because the VM may be started sooner on a destination host that has more memory.

Post-copy live migration, however, may present challenges to successfully completing live migration of VMs running on a source host that has over-committed its memory. In conventional post-copy live migration, virtual memory associated with the migrating VM is first read into physical memory from the backing store, then transmitted from physical memory to the destination host. In cases in which the source host has over-committed its memory, attempts to read into additional memory pages to physical memory may break the over-commit, placing undue strain on the source host's memory and result in increased resource usage. This may delay the live migration process.

Aspects of the present disclosure address the above noted and other deficiencies by providing memory over-commit support for live migration of virtual machines by transmitting VM memory pages in a certain order. Implementations of the present disclosure may prioritize transmitting certain memory pages during VM live migration to reduce resource usage on the source host and improve latency during the migration process. In implementations, the source hypervisor may first transmit memory pages associated with the VM that are present in the page cache residing the host RAM, a copy of which may not necessarily be kept in the backing store. The entire page cache may be transmitted, or a part of the page cache may be transmitted. In implementations, the hypervisor may transmit only "dirty" memory pages. Dirty pages are memory pages that are have been modified while in the host RAM, and thus are no longer identical to the memory stored on the backing store. When a page in page cache is identical to the memory page stored on the backing store, the memory page is "clean."

Once this transmission is complete, the VM may be started on the destination host computer system. Since memory pages in the page cache represent the memory pages that the VM recently accessed, transmitting those memory pages first may help ensure that the VM may begin running on the destination host with no or minimal errors.

Once the VM is running on the destination, if only a part of the host page cache was transmitted to the destination, the hypervisor may transmit the rest of the memory pages in the host page cache. Since the VM was still running on the source host as the memory pages were being transmitted, the hypervisor may determine whether any of the memory pages transmitted to the destination host have been modified while the memory pages were being transmitted. If so, the hypervisor may identify those memory pages and transmit the modified memory pages.

In implementations, the hypervisor may mark the pages transmitted to the destination as clean on the source host. The hypervisor may discard the transmitted memory pages, thus freeing up space in the host RAM. The hypervisor may utilize this memory space to read into the host RAM memory pages from the backing store. These memory pages may then be transmitted to the destination host.

Aspects of the present disclosure present advantages over conventional solutions to the issues noted above. By prioritizing dirty memory pages held in host RAM, implementations of the present disclosure avoid undue pressure on memory on the over-committed host. More specifically, implementations of the present disclosure avoid the need to push dirty memory pages from the host RAM to a backing store during live migration, thus reducing the amount of input/output performed on the source host, and improving latency during live migration. Improving latency during live migration, in turn, frees up the source host resources, which may then be used for other processes.

Figure 1:
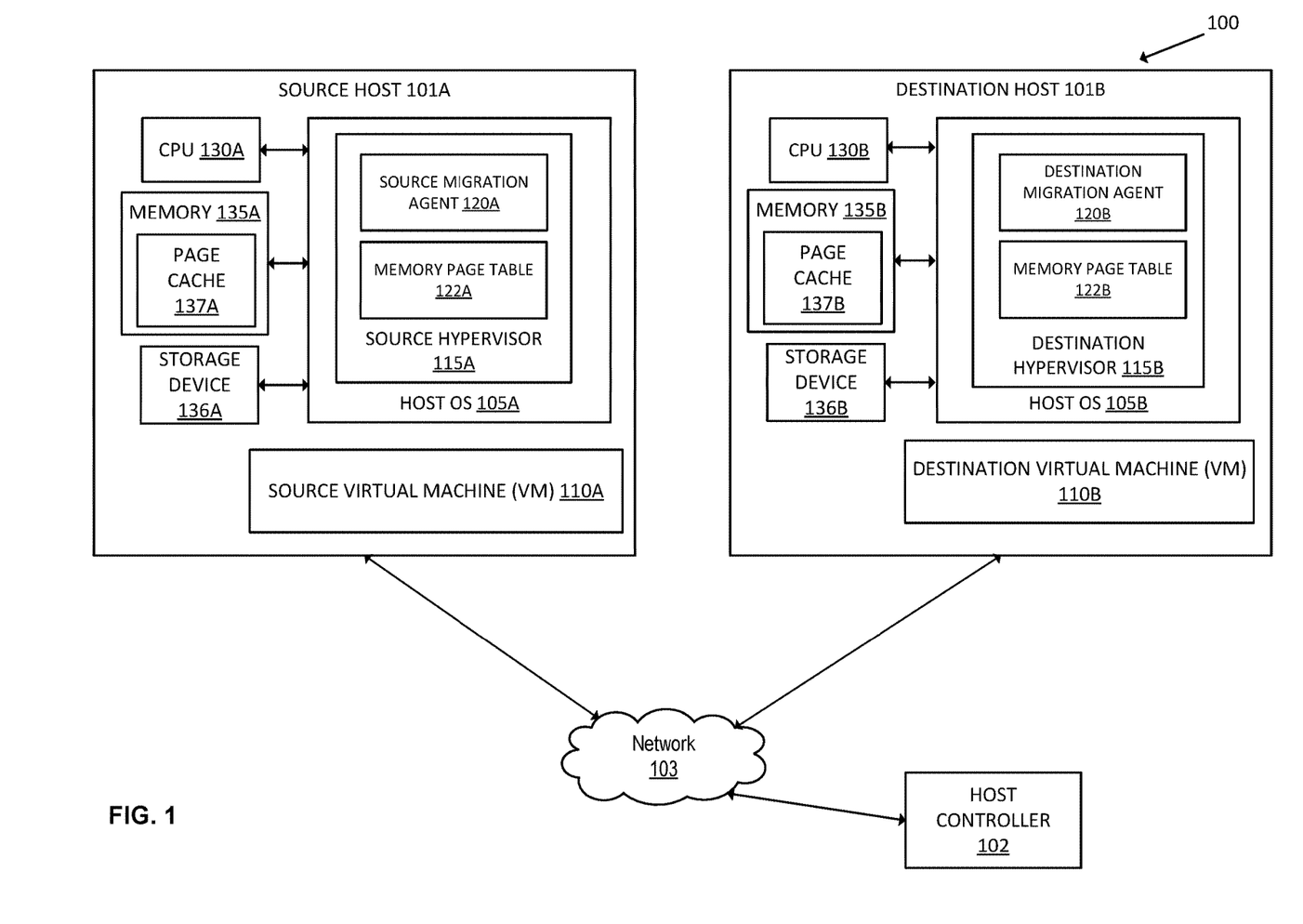
FIG. 1 depicts a block diagram of an example virtualization system architecture operating in accordance with one or more aspects of the present disclosure.

FIG. 1 is a block diagram that illustrates sample virtualization architecture 100 in accordance with one or more aspects of the present disclosure. The virtualization architecture 100 can include a source host computer system 101A, a destination host computer system 101B, and a host controller 102. The source host computer system 101A, destination host computer system 101B, and a host controller 102 can be communicably connected over a network 103. The network 103 can be a private network (e.g., a local area network (LAN), a wide area network (WAN), intranet, etc.) or a public network (e.g., the Internet).

The source host computer system 101A and destination host computer system 101B can be a server, a workstation, a personal computer (PC), a mobile phone, a smart phone, a mobile computing device, a personal digital assistant (PDA), tablet, laptop computer, thin client, etc. The source host computer system 101A and destination host computer system 101B can include one or more physical central processing units (CPUs) 130A-130B, memory 135A-135B, and peripheral devices (not illustrated). The physical devices can be any type of devices, including a data storage device or mass storage device, such as a magnetic or optical storage based disk, tape or hard drive. Other examples of physical devices can include network devices, graphics devices, system components (e.g., bridges, ports, buses) media devices, (e.g., video cards, sounds cards, etc.).

The source host computer system 101A and destination host computer system 101B can include one or more virtual machines 110A-110B and execute operating systems ("host OS") 105A-105B to manage resources (e.g., CPU 130A-130B, memory 135A-135B, storage devices 136A-136B, physical devices, etc.), respectively. The virtual machines 110A-110B can run a guest operating system ("guest OS").

The host OS 105A-105B can include hypervisors 115A-115B. The hypervisors 115A-115B can also be known as a virtual machine monitor (VMM) or a kernel-based hypervisor. The hypervisors 115A-115B can be part of the host OS 105A-105B, run on top of the host OS 105A-105B, or run directly on the host hardware without an operating system beneath it. The hypervisors 115A-115B can assign physical devices to the virtual machines 110A-110B and can expose the physical devices to the guest OS of the virtual machines 110A-110B as a part of the virtual machines 110A-110B. In some implementations, the hypervisors 115A-115B can include migration agents 120A-120B. Although the migration agents 120A-120B are shown as a part of the hypervisors 115A-115B, they can be separate components coupled to hypervisors 115A-115B.

The migration agents 120A-120B at the respective host computer system 101A-101B manage migration of the source virtual machine 110A from the source host 101A to the destination host 101B in accordance with commands from a host controller 102. The host controller 102 can manage migration of the source virtual machine 110A from the source host 101A to the destination host 101B by coordinating with the migration agents 120A and 120B at the host computer systems 101A and 101B. The host controller 102 can reside on a designated computer system (e.g., a server computer, a desktop computer, etc.) or be part of the host computer systems 101A and 101B or another machine. The host controller 102 can issue a request to migrate the source virtual machine 110A from the source host computer system 101A to the destination host computer systems 101B. In some implementations, the host controller 102 can instruct the destination host computer system 101B to start the migrated virtual machine 110B via the migration agent 120B.

In some implementations, the hypervisors 120A-120B may include a memory page table 122A-122B to store information regarding memory pages associated with the respective virtual machine 110A-110B. In implementations, memory pages tables 122A-122B may be a page tracking memory data structure facilitating translation of virtual memory addresses to physical memory addresses. Memory pages tables 122A-122B may include table entries corresponding to a plurality of memory pages mapped into the virtual address space of VM 110A-110B respectively. Each table entry may indicate whether the memory page is currently present in the page cache 137A-137B, and may further indicate whether the memory page is dirty or clean. A dirty memory page is one that does not match the copy in the backing store, (e.g. storage device 136A-136B), and may need to be synchronized. A clean memory page is one has its data stored elsewhere, e.g., in storage device 136A-136B. In implementations of the present disclosure, during live migration, a page table entry in memory page table 122A may indicate whether a memory page has been modified by source VM 110A after it was transmitted to destination host 101B.

In embodiments, the source host 101A may support a virtual memory environment in which a virtual machine address space is simulated with a smaller amount of the host random access memory (RAM) and a backing store (e.g., a file on a disk or a raw storage device), thus allowing the source host 101A to over-commit the memory. For example, when the memory of source host 101A is not over-committed, virtual memory associated with source VM 110A may be in memory page cache 137A of memory 135A. However, when the memory of source host 101A becomes over-committed, source hypervisor 115A may swap or map one or more memory pages associated with source VM 110A to a backing store, such as storage device 136A, and may update memory page table 122A accordingly.

During live migration of source VM 110A from source host 101A to destination host 101B, source hypervisor 115A may prioritize migrating the one or more memory pages associated with source VM 110A that are in page cache 137A. In certain implementations, source hypervisor 115A may first transmit memory pages in page cache 137A associated with source VM 110A that are dirty (either all dirty memory pages in page cache 137A or a subset of the dirty memory pages in page cache 137A). Once those memory pages are transmitted to destination host 101A, the destination VM 110B may be started on destination host 101A.

Because source VM 110A may be still running while the memory pages are transmitted, hypervisor 115A may determine whether any of the transmitted memory pages were modified by source VM 110A during the transmission time. More specifically, hypervisor 115A may update memory page table 122A to indicate whether the transmitted memory pages have been modified. Hypervisor 115A may identify the modified memory pages and transmit the modified memory pages to destination host 101B.

Hypervisor 115A may mark the transmitted memory pages as clean in memory page table 122A. Hypervisor 115A may discard the transmitted from page cache 137A. Discarding the transmitted memory pages may include disassociating or unmapping the memory pages in memory page table 122A (i.e., discarding the existing mapping). Discarding the memory pages from page cache 137A enables source hypervisor 115A to read additional memory pages associated with source VM 110A from storage device 136A into page cache 137A in memory 135A. Hypervisor 115A may then transmit the newly read memory pages from page ache 137A to destination host 101B.

The "source" and "destination" designations for the host computer systems, hypervisors, virtual machines, migration agents, and hardware configuration monitors are provided for reference purposes in illustrating example implementations of the migration process according to embodiments.

Figure 2:
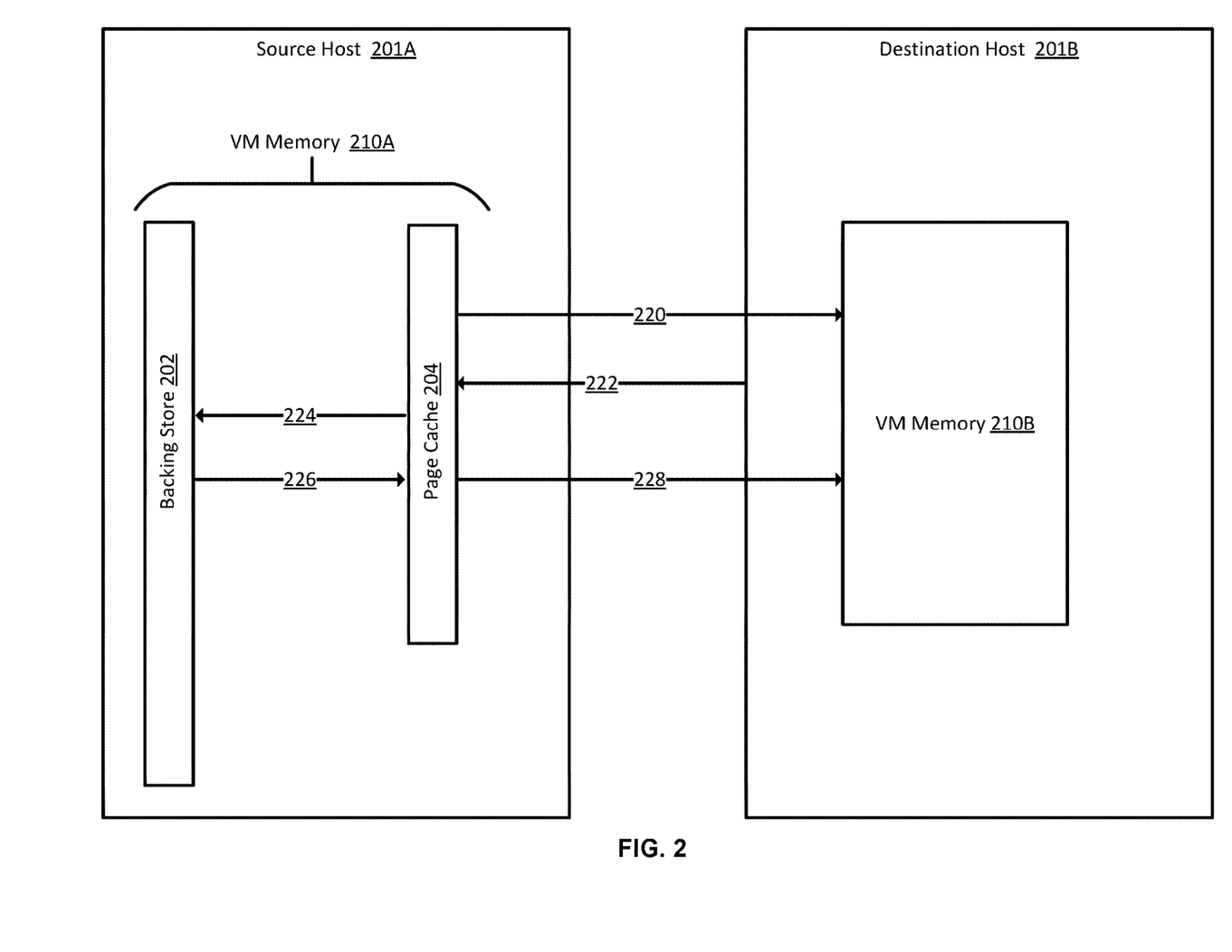
FIG. 2 depicts a block diagram illustrating an implementation of a method executed by a host module (e.g., a hypervisor) for memory over-commit support for live virtual machine migration, in accordance with one or more aspects of the present disclosure.

FIG. 2 depicts a block diagram of a method 200 illustrating providing memory over-commit support for live migration of virtual machines, in accordance with one or more aspects of the present disclosure. Method 200 may be performed by processing logic that includes hardware (e.g., circuitry, dedicated logic, programmable logic, microcode, etc.), software (e.g., instructions run on a processor to perform hardware simulation), or a combination thereof. Method 200 or each of its individual functions, routines, subroutines, or operations may be performed by one or more processors of a computer system (e.g., host computer system 110 of FIG. 1) implementing the method. In an illustrative example, method 200 may be performed by a single processing thread. Alternatively, method 200 may be performed by two or more processing threads, each thread implementing one or more individual functions, routines, subroutines, or operations of the method. In an illustrative example, the processing threads implementing method 200 may be synchronized (e.g., using semaphores, critical sections, or other thread synchronization mechanisms).

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

In FIG. 2, a virtual machine is undergoing live migration from source host 201A to destination host 201B. At the time of the live migration, source host 201A memory may be over-committed. To manage the memory over-commitment, source host 201A may allocate VM memory 210A between page cache 204 and backing store 202. Backing store 202 may be a disk storage device, or may be some other non-volatile memory device. In implementations, source host 201A may use disk-mapping or memory swapping techniques to achieve this result.

A hypervisor, e.g. hypervisor 115A in FIG. 1, may initialize live migration of the VM. The hypervisor may identify memory pages associated with the virtual machine in page cache 204. At operation 220, the hypervisor may transmit the memory pages from page cache 204 to the destination host 201B. In implementations, the hypervisor may transmit all the memory pages associated with the VM in page cache 204, or may transmit a part of the memory pages associated with the VM in page cache 204. The part of the memory pages may be "dirty" memory pages, i.e., memory pages in page cache 204 that do not match the memory pages in backing store 202. In implementations, source host 201A may maintain a memory data structure to record whether a memory page is clean or dirty. In implementations, because the VM is still running on the source host 201A as the memory pages from page cache 204 are being transmitted, the memory pages being transmitted may have been modified. The hypervisor may identify the modified memory pages and transmit the modified memory pages to destination host 201B.

After receiving the memory pages from source host 201A, destination host 201B may start the VM on the destination host 201B. At operation 222, the source hypervisor may receive a notification from destination host 201B indicating that the VM has been successfully started on destination host 201B.

The source hypervisor may discard the transmitted memory pages. In implementations, at operation 224, the source hypervisor may mark the transmitted memory pages as clean, and may disassociate or un-map the memory pages from backing store 202.

At operation 226, the source hypervisor may read, from backing store 202, into host page cache 204 one or more memory pages that are associated with the VM undergoing live migration. At operation 228, the source hypervisor may transmit the one or more memory pages to destination host 201B.

Figure 3:
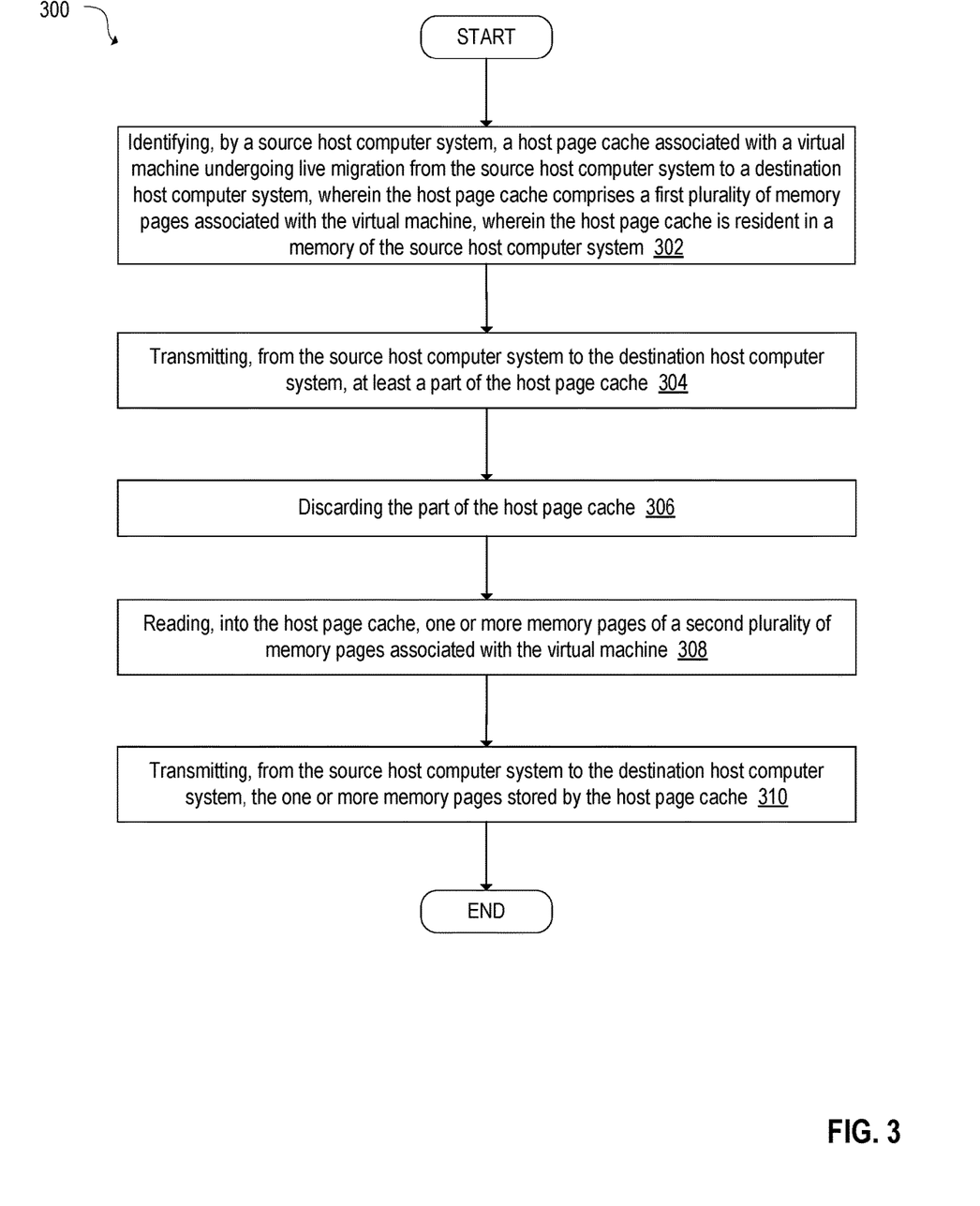
FIG. 3 is a flow diagram of an example method of providing memory over-commit support for live migration of a virtual machine, in accordance with one or more aspects of the present disclosure.

FIG. 3 depicts a flow diagram of an example method 300 for providing memory over-commit support for live migration of a virtual machine, in accordance with one or more aspects of the present disclosure. Method 300 may be performed by processing logic (e.g., in computer system 100 of FIG. 1) that may comprise hardware (e.g., circuitry, dedicated logic, programmable logic, microcode, etc.), software (such as instructions run on a processing device), firmware, or a combination thereof. In one embodiment, method 300 is performed primarily by a source hypervisor (e.g., source hypervisor 115A) residing on the source host.

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

At block 302, processing logic of a source host computer system may identify a host page cache associated with a VM undergoing live migration from the source host computer system to a destination host computer system. The host page cache may include a first plurality of memory pages associated with the VM. The host page cache may reside in memory on the source host computer system.

At block 304, processing logic may transmit, from the source host computer system to the destination host computer system, at least a part of the host page cache. In implementations, the part of the host page cache that is transmitted is "dirty," i.e., contains some or all of the dirty memory pages stored on the host page cache. Additionally or alternatively, the part of host page cache that is transmitted to the destination may include one or more memory pages that are not stored in the backing store, i.e., that are different from the memory pages stored on the disk file. The source host computer system may maintain a memory data structure comprising a plurality of records storing information regarding memory pages associated with the virtual machine. For example, the memory data structure may be a memory page table, and the table entries may correspond to a plurality of memory pages mapped into the virtual address space of the VM. The data structure may indicate whether a memory page is clean or dirty. In embodiments, a clean memory page may indicate that it is the memory page is safe to discard once it has been transmitted to the destination host.

In implementations, the processing logic may, in response to transmitting the part of the host page cache, mark the part of the host page cache as clean by updating an indicator (e.g., a bit in the associated page tracking memory data structure) associated with the one or more memory pages in the part of the host page cache. Marking the transmitted part(s) of the host page cache as clean may enable the processing logic to identify the memory page(s) that are safe to discard. This may enable to the source host computer system to mark the transmitted dirty memory page(s) as clean (and thus discard the transmitted dirty memory page(s)) without having to synchronize the dirty memory page(s), thus reducing resource usage during live migration and improving latency.

In implementations, the processing logic may determine whether any of the memory pages associated with the part of the host page cache that was transmitted have been modified by the source host during transmission time. The processing logic identify, in the memory data structure, the records associated with the transmitted memory pages. The memory data structure records may indicate whether the memory pages have been modified since they were transmitted. The processing logic may identify the modified memory pages and transmit the modified memory pages to the destination host. Furthermore, if the processing logic did not transmit all memory pages associated with the VM stored on the host page cache, the processing logic may transmit the rest of the memory pages associated the VM stored on the host page cache.

At block 306, processing logic may discard the part of the host page cache. In implementations, the processing logic may discard the part of the host page cache transmitted to the destination host computer system immediately after transmission. Additionally or alternatively, the processing logic may receive a notification from the destination host computer system indicating that the VM has successfully started on the destination host computer system prior to discarding the part of the host page cache. In implementations, discarding the part of the host page cache may include disassociating the one or more memory pages in the part of the host page cache from the disk file in the page tracking memory data structure. That is, the source host may update respective table entries in the memory page table to disassociate (or un-map) the page cache memory page, thus freeing up space in the page cache.

At block 308, processing logic may read into the host page cache one or more memory pages of a second plurality of memory pages associated with the VM. The second plurality of memory pages may be stored on a backing store, such as a disk file or some other non-volatile memory device. That is, the processing logic may take advantage of the newly freed up space in the host page cache to read into it memory pages associated with the VM that are stored on the backing store (i.e., the disk file). At block 310, processing logic may transmit, from the source host computer system to the destination host computer system, the one or more memory pages stored by the host page cache.

Figure 4:
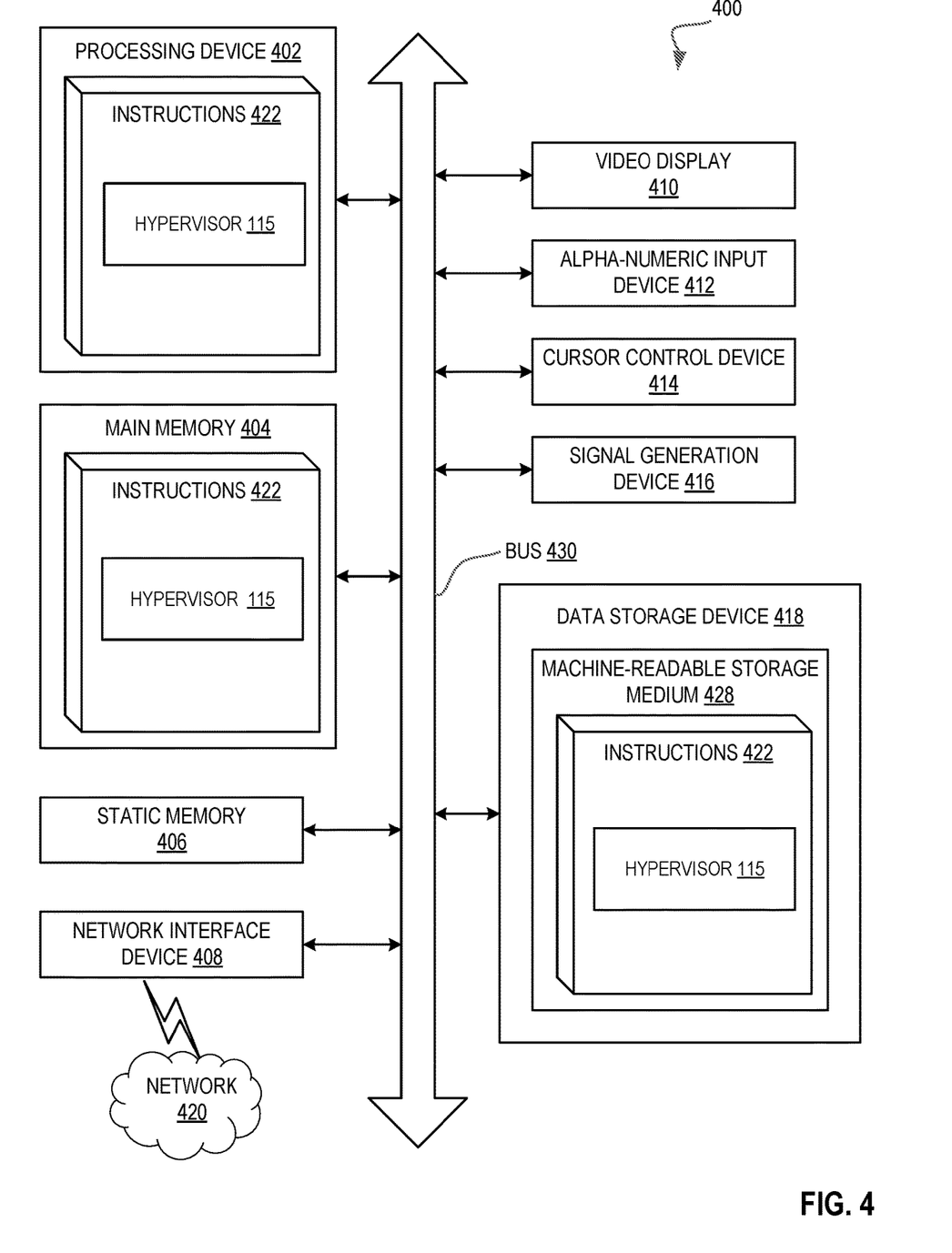
FIG. 4 depicts a block diagram of an illustrative computer system operating in accordance with one or more aspects of the present disclosure.

FIG. 4 is a diagrammatic representation of a machine in the exemplary form of a computer system 400 within which a set of instructions for causing the machine to perform any one or more of the methodologies discussed herein may be executed. In various illustrative examples, computer system 400 may correspond to source host 101A and/or destination host 101B of FIG. 1. Computer system 400 may be included within a data center that supports virtualization. Virtualization within a data center results in a physical system being virtualized using virtual machines to consolidate the data center infrastructure and increase operational efficiencies. A VM may be a program-based emulation of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain embodiments, computer system 400 may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. Computer system 400 may be provided by a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that device. Further, while only a single machine is illustrated, the term "computer" shall also be taken to include any collection of computers that individually or jointly execute a set (or multiple sets) of instructions to perform any one or more of the methodologies discussed herein.

The example computer system 400 may include a processing device 402, a main memory 404 (e.g., read-only memory (ROM), flash memory, dynamic random access memory (DRAM) (such as synchronous DRAM (SDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets. Processing device 402 may also be one or more special-purpose processing devices such as an application specific integrated circuit (ASIC), a field programmable gate array (FPGA), a digital signal processor (DSP), network processor, or the like. Processing device 402 may be configured to execute hypervisor 115 for programming the operations and steps discussed herein.

Computer system 400 may further include a network interface device 408. Computer system 400 may also include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

Data storage device 418 may include a machine-readable storage medium (or more specifically a computer-readable storage medium) 420 having one or more sets of instructions (e.g., the hypervisor 115) embodying any one or more of the methodologies of functions described herein. The hypervisor 115 may also reside, completely or at least partially, within main memory 404 and/or within processing device 402 during execution thereof by computer system 400; main memory 404 and processing device 402 also constituting machine-readable storage media. Hypervisor 115 may further be transmitted or received over a network 426 via network interface device 408.

Machine-readable storage medium 420 may also be used to store the device queue manner logic persistently. While machine readable storage medium 420 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling," "transmitting," "requesting," "identifying," "querying," "retrieving," "forwarding," "determining," "passing," "processing," "issuing," "measuring," "caching," "monitoring," mapping," "estimating," "calculating," "disabling," "detecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), erasable programmable ROMs (EPROMs), electrically erasable programmable ROMs (EEPROMs), magnetic or optical cards, flash memory devices including universal serial bus (USB) storage devices (e.g., USB key drives) or any type of media suitable for storing electronic instructions, each of which may be coupled to a computer system bus.

The methods and illustrative examples described herein are not inherently related to any particular computer or other apparatus. Various general purpose systems may be used with programs in accordance with the teachings herein or it may prove convenient to construct more specialized apparatus to perform the required method 200, and/or each of their individual functions, routines, subroutines or operations. Examples of the structure for a variety of these systems are set forth in the description above.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
    allocating, by a source host computer system, a host page cache and a backing store to a virtual machine (VM), the VM undergoing live migration from the source host computer system to a destination host computer system;
    transmitting, from the source host computer system to the destination host computer system, in a priority order, at least a part of the host page cache, wherein the transmission of the part of the host page cache causes an instruction to start the VM on the destination host computer system following the transmission of the part of the host page cache;
    discarding the part of the host page cache;
    reading, into the host page cache, from the backing store, one or more memory pages of a second plurality of memory pages associated with the VM; and
    transmitting, from the source host computer system to the destination host computer system, the one or more memory pages stored by the host page cache.

2. The method of claim 1, wherein the second plurality of memory pages are stored on a disk file.

3. The method of claim 1, further comprising:
    responsive to determining that one or more memory pages associated with the part of the host page cache have been modified after having been transmitted to the destination host computer system, identifying one or more modified memory pages; and
    transmitting the one or more modified memory pages from the source host computer system to the destination host computer system.

4. The method of claim 3, wherein determining that one or more memory pages associated with the part of the host page cache have been modified after having been transmitted to the destination host computer system comprises:
    identifying, in a memory data structure comprising a plurality of records, a respective record associated with each of the one or more memory pages; and
    determining, based on the respective record, whether the associated memory page has been modified.

5. The method of claim 1, further comprising:
    responsive to transmitting the part of the host page cache, marking the part of the host page cache as clean in a page tracking memory data structure.

6. The method of claim 1, wherein discarding the part of the host page cache comprises:
    unmapping one or more memory pages in the part of the host page cache in a page tracking memory data structure.

7. The method of claim 1, further comprising:
    receiving a notification that the VM has been successfully started on the destination host computer system.

8. A system comprising:
    a memory; and
    a processing device of a source host computer system operatively coupled to the memory, the processing device to:
        allocate a host page cache and a backing store to a virtual machine (VM), the VM undergoing live migration from the source host computer system to a destination host computer system;
        transmit, from the source host computer system to the destination host computer system, in a priority order, at least a part of the host page cache, wherein the transmission of the part of the host page cache causes an instruction to start the VM on the destination host computer system following the transmission of the part of the host page cache;

discard the part of the host page cache;

read, into the host page cache, from the backing store, one or more memory pages of a second plurality of memory pages associated with the VM; and transmit, from the source host computer system to the destination host computer system, the one or more memory pages stored by the host page cache.

9. The system of claim 8, wherein the second plurality of memory pages are stored on a disk file.

10. The system of claim 8, wherein the processing device is further to:

responsive to determining that one or more memory pages associated with the part of the host page cache have been modified after having been transmitted to the destination host computer system, identify one or more modified memory pages; and transmit the one or more modified memory pages from the source host computer system to the destination host computer system.

11. The system of claim 10, wherein determining that one or more memory pages associated with the part of the host page cache have been modified after having been transmitted to the destination host computer system comprises:

identifying, in a memory data structure comprising a plurality of records, a respective record associated with each of the one or more memory pages; and determining, based on the respective record, whether the associated memory page has been modified.

12. The system of claim 8, wherein the processing device is further to:

responsive to transmitting the part of the host page cache, mark the part of the host page cache as clean in a page tracking memory data structure.

13. The system of claim 8, wherein discarding the part of the host page cache comprises:

unmapping one or more memory pages in the part of the host page cache in a page tracking memory data structure.

14. A non-transitory computer-readable media storing instructions that, when executed, cause a processing device to:

allocate, by a source host computer system, a host page cache and a backing store to a virtual machine (VM), the VM undergoing live migration from the source host computer system to a destination host computer system;

transmit, from the source host computer system to the destination host computer system, in a priority order, at least a part of the host page cache, wherein the transmission of the part of the host page cache causes an instruction to start the VM on the destination host computer system following the transmission of the part of the host page cache;

discard the part of the host page cache;

read, into the host page cache, from the backing store, one or more memory pages of a second plurality of memory pages associated with the VM; and transmit, from the source host computer system to the destination host computer system, the one or more memory pages stored by the host page cache.

15. The non-transitory computer-readable media of claim 14, wherein the second plurality of memory pages are stored on a disk file.

16. The non-transitory computer-readable media of claim 14, wherein the processing device is further to:

responsive to determining that one or more memory pages associated with the part of the host page cache have been modified after having been transmitted to the destination host computer system, identify one or more modified memory pages; and transmit the one or more modified memory pages from the source host computer system to the destination host computer system.

17. The non-transitory computer-readable media of claim 16, wherein determining that one or more memory pages associated with the part of the host page cache have been modified after having been transmitted to the destination host computer system comprises:

identifying, in a memory data structure comprising a plurality of records, a respective record associated with each of the one or more memory pages; and determining, based on the respective record, whether the associated memory page has been modified.

18. The non-transitory computer-readable media of claim 14, wherein the processing device is further to:

responsive to transmitting the part of the host page cache, mark the part of the host page cache as clean in a page tracking memory data structure.

19. The non-transitory computer-readable media of claim 14, wherein discarding the part of the host page cache comprises:

unmapping one or more memory pages in the part of the host page cache in a page tracking memory data structure.

20. The non-transitory computer-readable media of claim 14, wherein the processing device is further to:

receive a notification that the VM has been successfully started on the destination host computer system.

* * * * *